(12) United States Patent
Wetzer

(10) Patent No.: US 6,738,748 B2
(45) Date of Patent: May 18, 2004

(54) PERFORMING PREDICTIVE MAINTENANCE ON EQUIPMENT

(75) Inventor: Michael Wetzer, Pebble Beach, CA (US)

(73) Assignee: Accenture LLP, Palo Alto, CA (US)

( * ) Notice: Subject to any disclaimer, the term of this patent is extended or adjusted under 35 U.S.C. 154(b) by 742 days.

(21) Appl. No.: 09/825,633

(22) Filed: Apr. 3, 2001

(65) Prior Publication Data

US 2002/0143421 A1 Oct. 3, 2002

(51) Int. Cl.$^7$ .............................................. G06F 17/60
(52) U.S. Cl. ............................................... 705/9; 705/8
(58) Field of Search ............................... 700/100, 104, 700/108; 705/8, 9; 702/182–184

(56) References Cited

U.S. PATENT DOCUMENTS

| | | | |
|---|---|---|---|
| 4,908,775 A | | 3/1990 | Palusamy et al. ........... 364/508 |
| 5,216,612 A | * | 6/1993 | Cornett et al. ................. 700/96 |
| 5,311,562 A | * | 5/1994 | Palusamy et al. ........... 376/215 |
| 5,331,579 A | * | 7/1994 | Maguire, Jr. et al. ........... 703/2 |
| 5,434,775 A | | 7/1995 | Sims et al. |
| 5,596,507 A | * | 1/1997 | Jones et al. ................... 700/276 |
| 5,710,723 A | * | 1/1998 | Hoth et al. ................... 702/181 |
| 5,737,728 A | * | 4/1998 | Sisley et al. ..................... 705/8 |
| 5,778,381 A | | 7/1998 | Sandifer ....................... 707/104 |
| 5,877,961 A | * | 3/1999 | Moore .......................... 700/180 |
| 5,920,846 A | * | 7/1999 | Storch et al. ..................... 705/7 |
| 5,963,911 A | * | 10/1999 | Walker et al. ..................... 705/7 |
| 5,987,474 A | | 11/1999 | Sandifer ....................... 707/104 |
| 6,067,486 A | | 5/2000 | Aragones et al. |
| 6,110,214 A | * | 8/2000 | Klimasauskas ................. 703/2 |
| 6,128,543 A | * | 10/2000 | Hitchner ....................... 700/108 |
| 6,175,934 B1 | * | 1/2001 | Hershey et al. ............... 714/25 |
| 6,192,325 B1 | * | 2/2001 | Piety et al. .................. 702/184 |
| 6,230,480 B1 | | 5/2001 | Rollins, III ............... 60/39.182 |

OTHER PUBLICATIONS

McQueen, G., "Aircraft Maintenance," *Industrial Maintenance & Plant Operations*, Aug. 1996.
MIL–HDBK–61, Military Handbook, "Configuration Management Guidance," Sep. 1997.
International Search Report dated Oct. 4, 2002, for corresponding international application PCT/US02/09303.
Written Opinion dated Mar. 5, 2003, for corresponding international application PCT/US02/09303.

* cited by examiner

Primary Examiner—Leo Picard
Assistant Examiner—Michael D. Masinick
(74) Attorney, Agent, or Firm—Brinks Hofer Gilson & Lione

(57) ABSTRACT

A data processing system stores a first database of component data on components of an equipment. The data processing system stores a second database of maintenance personnel associated with corresponding qualifications. The data processing system associates at least one predictive maintenance factor (for a component) with the corresponding component data. A scheduler schedules maintenance for a maintenance time period for at least one of the components based on the first database, the second database, the associated predictive maintenance factor, and an elapsed time with respect to an installation date of at least one component. The predictive maintenance factor may be defined by one or more of the following: a longevity estimate, a probability of failure, a financial estimate on maintenance of a component.

31 Claims, 13 Drawing Sheets

PERFORMING PREDICTIVE MAINTENANCE ON EQUIPMENT

FIELD OF THE INVENTION

This invention relates to a method and system for performing predictive maintenance on equipment.

BACKGROUND

Equipment refers to any device, apparatus, machine, electronics, or assembly that requires maintenance or provides improved performance or greater longevity upon receipt of such maintenance. Equipment means any mechanical equipment, any electrical equipment, any data processing system, any electronics or optical equipment, any software associated with mechanical equipment, electrical equipment, electronic equipment or a data processing system. A component may represent a part, an assembly of parts, a subassembly of a part, an element, or another constituent of a equipment.

Mechanical equipment refers to a machine or machinery that is formed of a defined arrangement of multiple components (e.g., parts). Mechanical equipment includes heavy equipment and capital-intensive equipment that is movable or fixed. Mobile mechanical equipment includes airplanes, busses, locomotives, ships, cranes, heavy trucks, earthmoving equipment, or the like. Fixed mechanical equipment includes electrical power generators, industrial presses, manufacturing equipment, or the like.

In the context of software as the equipment, maintenance may include installation of a software update or revision that improves the performance of the equipment or an associated physical process. The performance improvement may entail improving the execution speed of calculations performed by the software or eliminating a bug in the software. The software (e.g., avionics software) may control mechanical components of equipment that includes both software and mechanical components to reduce wear or stress on the mechanical components that are subject to a physical process or to improve the responsiveness of the entire system to new or existing inputs.

A configuration defines the identity of the components (e.g., parts), a specification of the components, and the relationship among the arrangement of components of the equipment, among other things. The configuration of equipment may vary throughout a life span of the equipment as maintenance work (e.g., maintenance, repair, and overhaul work) is performed.

The operator or owner of the equipment may operate the equipment with a reactive maintenance program that involves performing repairs only after a failure of a component has occurred or is imminent. Thus, the operator or owner of the equipment may suffer from unscheduled and unpredictable downtime of the equipment necessary to make repairs or perform maintenance. The downtime may translate into reduced revenue for business operations or reduced levels of customer satisfaction for customers that rely on the proper operation and availability of the equipment. Thus, a need exists to reduce downtime of the equipment to gain efficient utilization of the capital resources represented by the equipment as well as to perform maintenance during the lowest usage periods of the equipment.

Moreover, replacement components may be ordered upon a failure of the equipment, which increases the cycle time for maintenance, repair, and overhaul operations. For example, the operator of equipment may have a purchasing team that procures replacement components and supplies necessary for routine maintenance after a failure of a component has occurred. Maintenance workers and skilled technicians may be fully booked with other maintenance, repair, and overhaul projects when an unexpected equipment failure requires maintenance activity. Thus, a need exists for improving the availability of components and maintenance workers associated with the performance of maintenance activities.

SUMMARY OF THE INVENTION

In accordance with one aspect of the invention, a data processing system stores a first database of component data on components of equipment. The data processing system stores a second database of maintenance personnel associated with corresponding qualifications. The data processing system associates at least one predictive maintenance factor (for a component) with the corresponding component data. A scheduler schedules maintenance for a maintenance time period for at least one of the components based on the first database, the second database, the associated predictive maintenance factor, and an elapsed time with respect to an installation date of at least one component. The predictive maintenance factor may be defined by one or more of the following: a longevity estimate, a probability of failure, a financial estimate on maintenance of a component, a known down time period of the equipment, a known linkage of a predicted maintenance task to other maintenance tasks, or similar conditions.

PREFERRED EMBODIMENTS OF THE INVENTION

Figure 1:
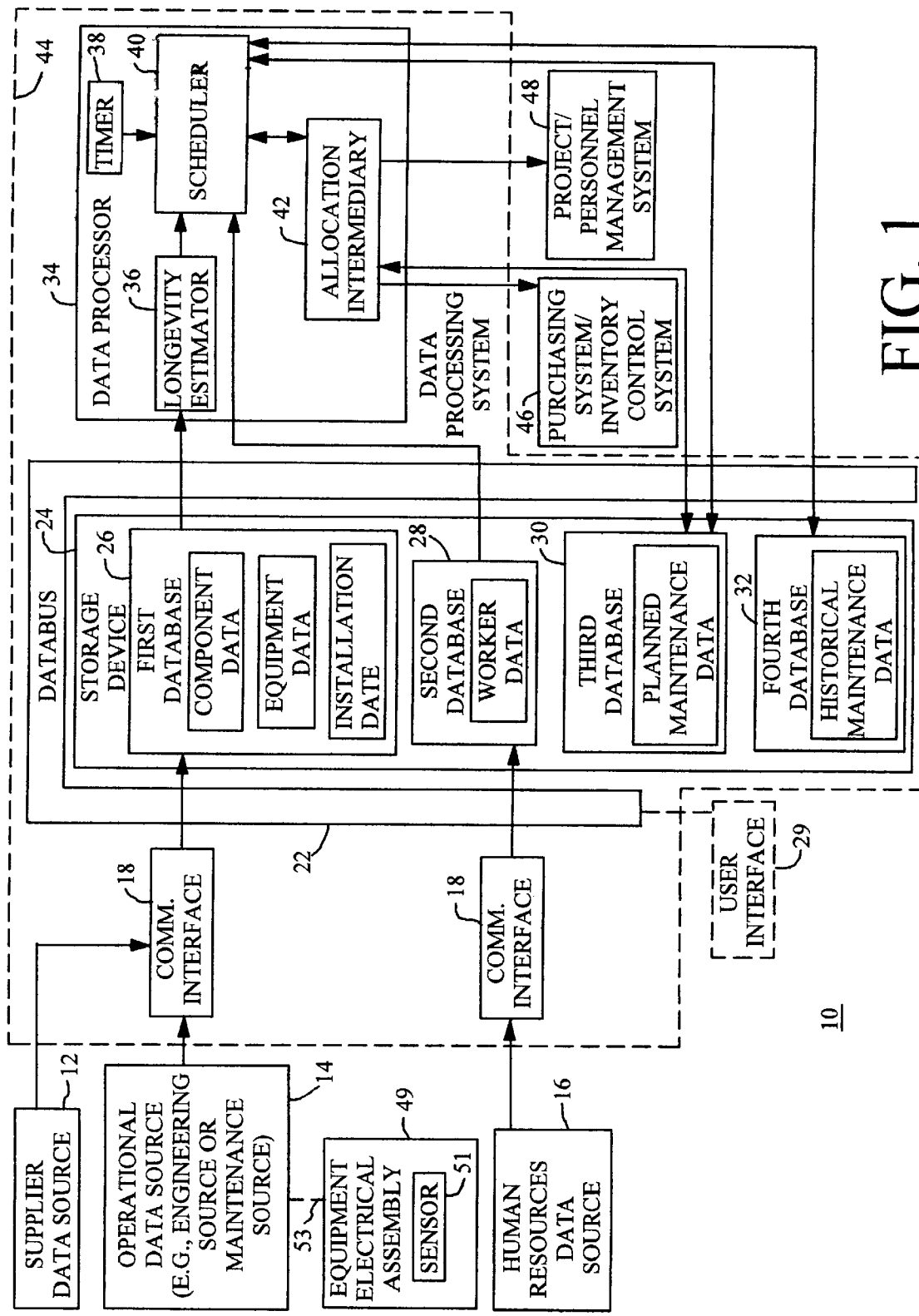
FIG. 1 is a block diagram of a system for performing predictive maintenance on equipment in accordance with the invention.

FIG. 1 is a block diagram of a data processing system 10 for predictive maintenance of equipment. A supplier data source 12, an operational data source 14, and a human resources data source 16 are arranged for communications with a data processing system 44. In turn, the data processing system 44 may communicate with one or more of the following: a purchasing system 46, an inventory control system, a personnel management system 48, and any other suitable business system.

The data processing system 44 includes at least one communications interface 18 that supports communications of the supplier data source 12, the operational data source 14, and human resources data source 16 with a storage device 24 via a databus 22. Although one databus 22 is shown in FIG. 1, in an alternate embodiment the data processing system may include multiple databases along with a multi-processor or parallel processing computer architecture.

The storage device 24 refers to a magnetic, optical, electronic, or another storage device for storing and retrieving data of one or more databases. As shown in FIG. 1, the storage device 24 supports a first database 26, a second database 28, a third database 30, and a fourth database 32. The storage device 24 may be coupled to a data processor 34 via the databus 22, or otherwise. The data processor 34 may include one or more microprocessors, electronic memory supporting the functionality of the microprocessor or microprocessors, and software instruction modules stored in the microprocessor or microprocessors, the electronic memory, or any combination of the foregoing elements. As shown in FIG. 1, the software instruction modules include a component longevity estimator 36, a timer 38, a scheduler 40, and an allocation intermediary 42. The component longevity estimate, provided by the component longevity estimator 36, represents one example of a predictive maintenance factor.

The arrows of FIG. 1 illustrate the respective directions of data flow in the data processing system 10 for predictive maintenance of equipment (e.g., mechanical equipment), although other directions of data flow are possible and fall within the scope of the invention. For example, in an alternate embodiment, the direction of the data flow may be bidirectional between various elements.

The supplier data source 12 and the operational data source 14 may be coupled to a communications interface 18 that accesses the first database 26 in the storage device 24. In general, the supplier data source 12 and the operational data source 14 provide at least configuration data on the equipment. Each equipment represented in the first database 26 has corresponding configuration data. Configuration data defines the identity of the components (e.g., parts), a specification of the components, and the relationship among the arrangement of components of the equipment, among other things. A component refers to a part, an assembly, a subassembly, or another constituent member of the equipment.

Configuration data may include manufacturing data. The supplier data source 12 may provide manufacturing data concerning a component. For example, the supplier data source 12 may provide longevity reference data on a component of the equipment or the equipment. The longevity reference data indicates the expected life span of a component. During the expected life span, the component meets or exceeds a threshold reliability criteria. The threshold reliability criteria may refer to a percentage of availability of the equipment or a component of the equipment. In one embodiment, the supplier data source 12 may provide longevity reference data, component serial numbers, component identifiers, component descriptions, manufacturer data on a component or other data that is suitable for input to the component longevity estimator 36.

The data processing system 44 uses configuration data to organize components and track components of the equipment in a coherent manner. The configuration data (e.g., component identifiers) may be used to index different components in the databases (e.g., the first database 26) that require maintenance for a particular equipment or group of similar equipment. Different equipment identifiers may be assigned to different pieces of equipment to facilitate distinguishing one piece of equipment from another. Each equipment identifier may be associated with a set of configuration data. The actual configuration data includes information such as part number, serial number, installation data, utilization, manufacturer, location, reliability data, maintenance data, or the like. Initially, an original equipment manufacturer may provide configuration data. After maintenance is conducted, an additional data source may supplement or modify the data from the original equipment manufacturer on a component. The additional data source may refer to a maintenance tracking system that facilitates updates in the configuration data when or after an installation or maintenance activity occurs.

The operational data source 14 may provide usage data for storage in the first database 26. The first database 26 may store or organize the usage data on an equipment-by-equipment basis, a component-by-component basis, or both to facilitate query procedures and data retrieval. The usage data may be attained from prior maintenance, inspection, and monitoring of the operation of the equipment or a component thereof. The operational data source 14 may provide usage data on a component-by-component basis and for the entire mechanical equipment.

Usage data provides an indication of the activity of the equipment to permit the prediction of the probability of failure of a component or the longevity of the component. Usage data may be expressed in accordance with a variety of alternative formats, including hours of activity of a component, cycles of alternating activity and inactivity of the component, total time in service for a component. Further, usage data may be based on predicted or anticipated demand for prospective use of the equipment. In one embodiment, an operator of the equipment may report usage statistics via a reporting device. In another embodiment, the equipment may have a usage monitoring system that outputs information about the use of a component, a system of the equipment, or the equipment. Further, the usage monitoring system may provide information on longevity, environmental factors, use profiles, customer requirements, and operating limitations. In the context of an aircraft as the equipment, the usage monitoring system may be mounted onboard an aircraft with sensors 51 that provide a flight profile, flight time, and a flight schedule.

As shown in FIG. 1, an electrical assembly 49, associated with the equipment, may support an onboard sensor 51 that transfers data to the operational data source 14 via a removable wireline data interface 53 (e.g., connector coupled to cables), as indicated by the dashed line connecting the operational data source 14 to the electrical assembly 49. The operational data source 14 feeds the sensor data on actual operating conditions associated with at least one component or the equipment to the data processing system 44 for interpretation by the longevity estimator 36, a predictive maintenance controller, or another processing module.

In an alternate embodiment, the removable wireline interface 53 may be replaced with a wireless data interface (e.g., a radio frequency communications system) or a Bluetooth wireless arrangement. Accordingly, the configuration of FIG. 1 may apply in the context where the equipment is mobile, because the wireless data interface or the removable wireline interface 53 do not interfere with mobility of the equipment.

The human resources data source 16 may provide repair personnel identifiers, resident locations associated with corresponding repair personnel, and qualifications data on certifications, past experience, or capabilities of corresponding repair personnel. In addition, the human resources data source 16 may provide an availability flag which indicates when a particular repair person is available or unavailable at a particular time. For example, a repair person may initiate or maintain the updating of the human resources data source 16 when the repair person takes a vacation, takes a leave of absence, travels for a business trip, or is engaged in a different repair, maintenance or overhaul activity. The second database 28 primarily stores worker data on workers or repair personnel to facilitate the planning of predictive maintenance.

The longevity estimator 36 may support predictive maintenance by executing one or more of the following activities: (1) passing through a reference estimated longevity provided by the supplier data source 12 or the operational data source 14 to the scheduler 40; (2) modifying a reference estimated longevity provided by the supplier data source 12 to be consistent with the usage data provided by the operational data source 14; (3) deriving a reference estimated longevity for a component by using usage data, historical maintenance data, or both; (4) monitoring component performance or system performance with reference to a predetermined performance profile, while the component or system is in use, and (5) identifying performance anomalies, potential deficiencies, or actual deficiencies relative to the requisite predictive maintenance.

The first database 26 and the second database 28 provide component data and worker data to the scheduler 40. The first database 26 may communicate the component data or an estimated reference longevity to the scheduler 40 via the longevity estimator 36. In one embodiment, the component data includes at least a component identifier and an installation date. The longevity estimator 36 provides longevity reference data to the scheduler 40 and the timer 38 provides present time or an elapsed duration measured with reference to the installation date.

The component longevity estimator 36 may use the usage data and the longevity reference data (from the supplier data source 12) to revise the longevity reference data to a revised value. The longevity estimator 36 may scale the reference longevity data based upon the usage data. That is, the reference longevity data may contain an inherent assumption about the longevity based on an assumed usage rate or level. If the usage data indicates that the component or equipment exceeds (e.g., materially exceeds) the assumed usage rate, the longevity estimator 36 may shorten the reference longevity to a revised reference longevity. In contrast, if the usage data indicates that the component or equipment has a lesser usage rate (e.g., a significantly lesser usage rate) than the assumed usage rate, the longevity estimator 36 may increase the reference longevity to a revised reference longevity. As a result, the remaining estimated reliable life span preferably provides a realistic and reliable estimate of performance of the mechanical equipment under actual operating conditions because the revised longevity reference data considers the usage data. Therefore, the expiration date or the longevity data may be modified based on the collection of usage data from sensors 51 on or affiliated with the equipment.

Figure 2:
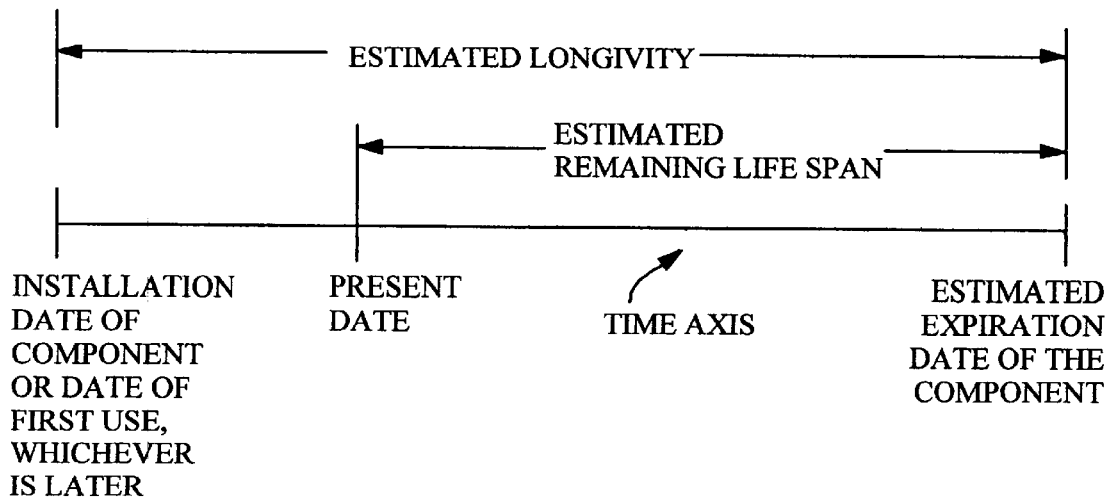
FIG. 2 is a timeline illustrating the concept of an estimated remaining life span consistent with the invention.

The scheduler 40 determines a remaining estimated reliable life span of a component. FIG. 2 is a graphical timeline that illustrates the remaining estimated life span. The longevity data defines an estimated longevity date with reference to the installation date of a component assuming a certain level (e.g., a minimum requisite level) of maintenance or supportive maintenance takes place. The longevity date refers to the expiration date or the last date on which the component is estimated to provide reliable service that meets or exceeds the reliability threshold. The estimated remaining life span of the component represents the interval between the present date or an elapsed time and the expiration date.

Returning to FIG. 1, the scheduler 40 defines maintenance activities which are expressed as planned maintenance data. Planned maintenance data refers to what maintenance should take place and when the maintenance should take place based on the estimated remaining reliable life span of the component or the equipment and an installation date of the component on the equipment. The scheduler 40 may store planned maintenance activities in the third database 30 and historical maintenance data in the fourth database 32. A manual or automatic entry of at least one maintenance worker may trigger the transfer of the planned maintenance data from the third database 30 to the fourth database 32, once a maintenance activity for an equipment is complete. For example, a maintenance worker may enter a confirmation that a maintenance activity has been successfully completed via the operational data source 14.

The scheduler 40 schedules maintenance for the component prior to the expiration of the remaining estimated life span, as indicated by the reference longevity or the revised reference longevity. Further, a safeguard interval prior to the expiration of the remaining estimated life span may be added to compensate for potential delays and inefficiencies in the component procurement process, labor shortages, or both.

Once the scheduler 40 determines an identity and a date range of an act of predictive maintenance or the planned maintenance data, the associated component and date range for the maintenance activity is sent to the allocation intermediary 42. The allocation intermediary 42 coordinates the bringing together of required component data, worker data, tools, instructions, and other information for planned maintenance at a common geographic location where the mechanical equipment is or will be situated. If the mechanical equipment is mobile, an additional database storing the location schedule of the mobile mechanical equipment is required to carry out the aforementioned coordination. Because the provision of labor and components are coordinated, workers can work to predetermined schedules, planners can facilitate procurement of components (e.g., replacement parts) by referencing reliable forecasts of required components, additional mechanical equipment, or supplies. The data processing system 44 may foster improved availability of a component for maintenance, improved availability of functional equipment, and timely fulfillment of hiring needs of the maintainer or user of the mechanical equipment. The terms of contracts with suppliers may be more firm or certain based on the improved availability and accuracy of forecasts and other information associated with the planned maintenance data outputted by the data processing system 44. Accordingly, the predictive maintenance system of the invention is well-suited for fostering improvements in logistics in the procurement of components (e.g., parts or spare parts) and the assignment of maintenance workers at a planned maintenance time.

The allocation intermediary 42 facilitates communication with one or more of the following: a purchasing system 46, an inventory control system, a personnel management system 48, an enterprise resource planning system of a supplier, an enterprise resource planning system of the operator of the mechanical equipment. The allocation intermediary 42 may foster electronic commerce or business-to-business among the operator of the equipment and various trading partners (e.g., supplier of components or repair services.)

Figure 3:
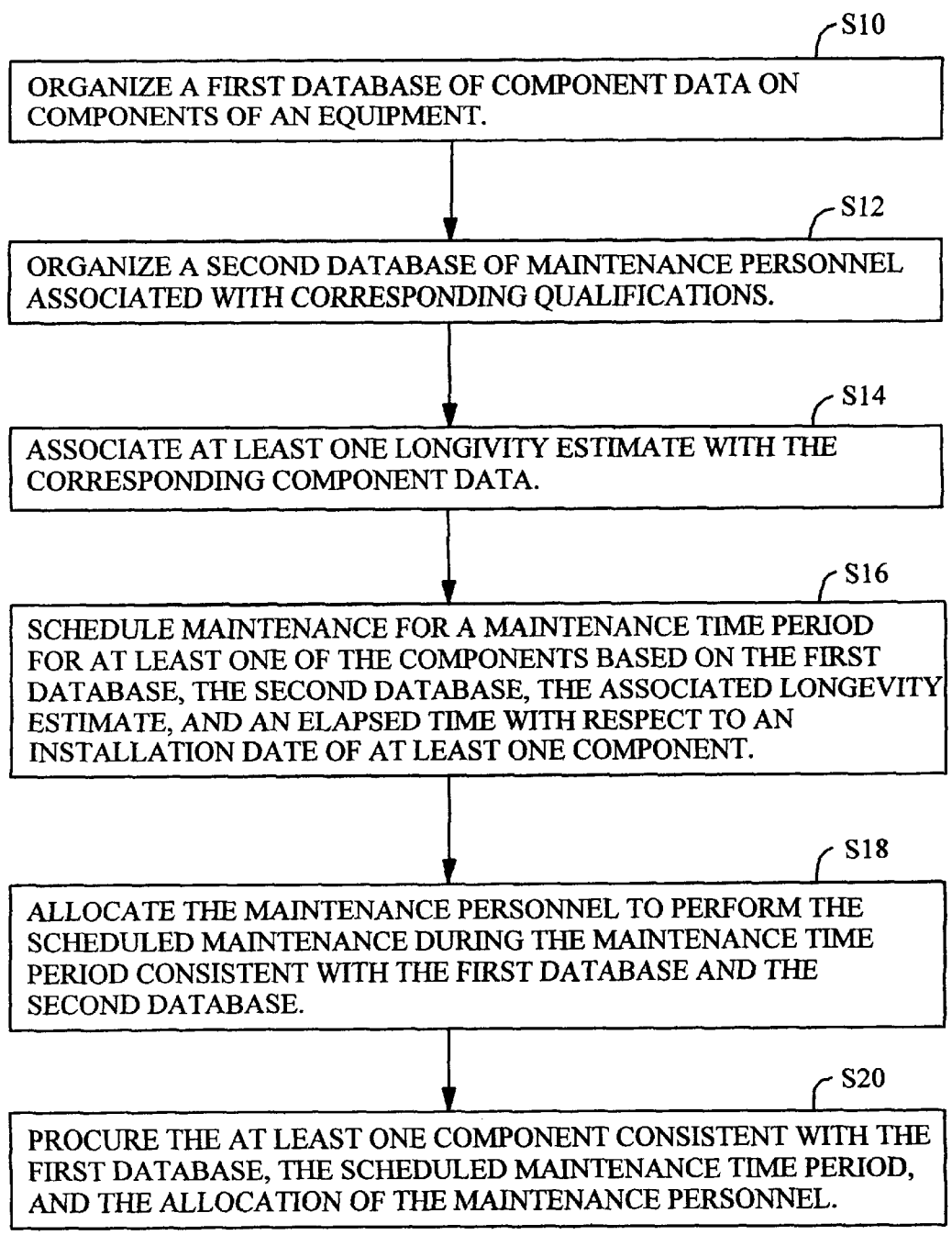
FIG. 3 is a flow chart of one embodiment of a method for performing predictive maintenance in accordance with the invention.

FIG. 3 shows a flow chart of an illustrative method for providing predictive maintenance for mechanical equipment in accordance with the invention. The method of FIG. 3 begins in step S10.

In step S10, a data processing system 44 supports a first database 26. For example, the data processing system 44 may organize received component data in the first database 26. The received component data may be received from a supplier data source 12, an operational data source 14, or a user interface 29 associated with the data processing system. The first database 26 contains component data associated with respective components of the mechanical equipment.

In step S12, the data processing system supports a second database 28. For example, the data processing system may organize received worker data or maintenance personnel data into the second database 28. The received worker data and maintenance personnel may be received from a human resource data source 16 or user entry into the user interface 29. The second database 28 contains worker data, such as maintenance personnel identifiers and corresponding qualifications of maintenance workers. Qualifications of maintenance workers may include certifications (e.g., technical repair certifications of mechanics), work experience, past performance evaluations, customer satisfaction surveys, or other information on the qualifications of the maintenance workers.

In step S14, at least one longevity estimate is associated with the corresponding component data. For example, the component data (e.g., component identifiers) of the equipment are associated with corresponding reference longevity data. The reference longevity data may provide a representation of the duration of expected reliable operation of a component after its installation date on equipment, or after first use of the equipment. The reference longevity data may be stored in the first database 26 on a component by-component basis, on an equipment-by-equipment basis, or otherwise. In step S16, a scheduler 40 or the data processing system schedules a maintenance requirement or maintenance activity for the component or the equipment for an upcoming maintenance time period. The maintenance requirement or planned maintenance activity is determined with reference to a present time or an elapsed time following the installation date or a date of first use of the equipment. The scheduler 46 may support the storage of planned maintenance data in the third database 30 for future reference. As planned maintenance activities are completed, the data processing system 44 may transfer the applicable planned maintenance data from the third database 30 into the fourth database 32 as historical maintenance data. The historical maintenance data may contain the maintenance history for a mechanical equipment on a component-by-component basis.

In one embodiment, the scheduler 40 verifies that the maintenance requirement has not already been completed by comparing the planned maintenance activity with the contents of a maintenance history data in the fourth database 32. If the planned maintenance activity has already been performed, as indicated by the comparison, an operator of the data processing system 44 may be notified to verify that the indicated completion is correct, that the planned maintenance activity is correct, or both. The verification prevents planned maintenance work from improperly being dismissed or repeated incorrectly where a previous repair or maintenance attempt was unsuccessful, and similar to a subsequent properly planned maintenance activity.

In an alternate embodiment, step S14 may comprise operating a system or component to a predetermined performance profile while monitoring a system performance of the system or a component performance of the component. Disparities between a monitored system performance and a reference system performance may facilitate identification of performance anomalies or deficiencies to be dealt with by the required predictive maintenance or the determination of a modified longevity estimate. Similarly, disparities between a monitored component performance and a reference component performance may facilitate the identification of performance anomalies or deficiencies to be dealt with by the required predictive maintenance or the determination of a modified longevity estimate. The reference component performance or system performance may be defined as component data.

In step S18, an allocation intermediary 42 or the data processing system 44 allocates maintenance personnel to perform the scheduled maintenance plan or maintenance activity of step S16 during the upcoming maintenance time period consistent with component data and maintenance data of the first database 26 and the second database 28. The availability and qualifications of maintenance workers in step S18 are determined by searching the second database 28 to coordinate the simultaneous availability of the component and labor during the upcoming maintenance time period.

In step S20, which may be accomplished before, during, or after the execution of step S18, the allocation intermediary 42 allocates the procurement of the equipment component, based on the first database 26 and the second database 28, consistent with the scheduled maintenance time period and availability of the maintenance personnel at the location of the equipment. For example, any component required for the planned maintenance data is procured to achieve availability for the installation within the scheduled maintenance time period. The procured component may be defined directly, or indirectly through specifications, in the first database 26.

In steps S18 and S20, the allocation intermediary 42 may facilitate the allocation of maintenance personnel and the procurement of at least one component (e.g., spare part or assembly) in accordance with several alternate techniques. Under a first technique, the allocation intermediary 42 takes role as an intermediary that supports access of a data management system (e.g., a purchasing system 46 or an enterprise resource planning system) to the maintenance requirement such that the data management system can fulfill a labor aspect, a component aspect, or a partial or complete portion of the database. For example, the allocation intermediary 42 may support read-only access to the planned data in the third database 30 by the data management system. The data management system may communicate with a supplier business management system (e.g., supplier order fulfillment center 56 of FIG. 9) via a communications network to facilitate a business-to-business transaction.

Under a second technique, the allocation intermediary 42 comprises a communications distribution module that distributes portions of the planned maintenance data to different external resources (e.g., supplier order fulfillment center 56 of FIG. 9), internal resources (e.g., purchasing system 46 or project personnel management system 48) or both for prospective fulfillment of the planned maintenance requirements. For example, the second technique may support bidding amongst competitors to satisfy a maintenance requirement at lowest economic cost. The allocation intermediary 42 might place a purchase order to a supplier (via a supplier order fulfillment center 56 of FIG. 9) with a lowest bid for the provision of the component with a delivery date consistent with the maintenance time period.

Figure 4:
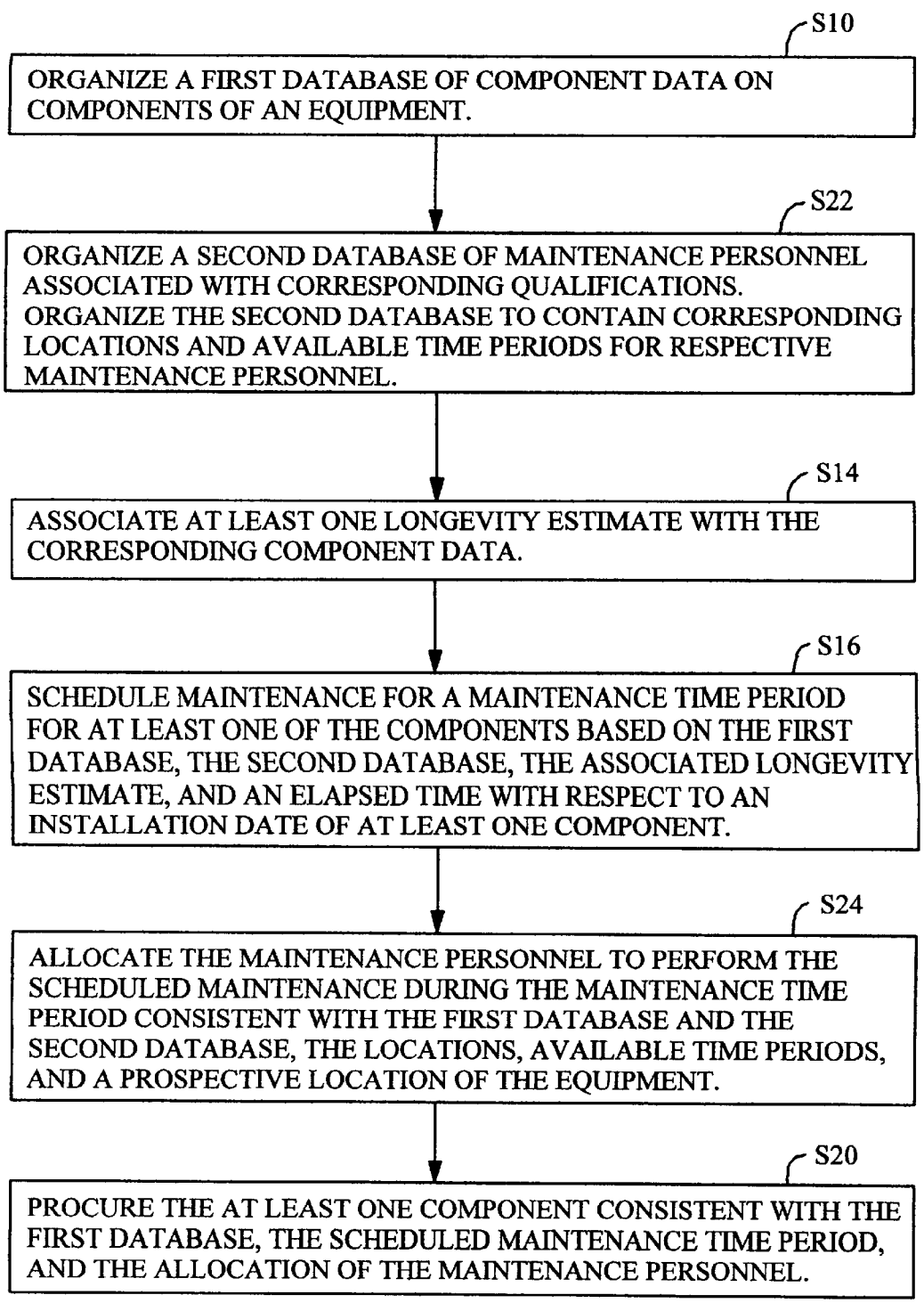
FIG. 4 is a flow chart of another embodiment of a method for performing predictive maintenance in accordance with the invention.

The method of FIG. 4 is similar to the method of FIG. 3 except step S22 of FIG. 4 replaces step S12 of FIG. 3 and step S24 of FIG. 4 replaces step S18 of FIG. 3. Like reference numbers in FIG. 3 and FIG. 4 indicate like steps.

Step S22 may follow step S10 as shown in FIG. 4. In step S22, a second database 28 of maintenance personnel data is supported. Within the second database 28, maintenance personnel identifiers are associated with corresponding qualifications. Further, the second database 28 is organized to contain corresponding resident locations (e.g., work facility identifiers) and available time periods for respective maintenance personnel identifiers. The available time periods indicate intervals during which corresponding maintenance workers are available for work or a prospective maintenance assignment.

In step S24, following the scheduling of a maintenance requirement or maintenance plan in step S16, the data processing system 44 or the allocation intermediary 42 allocates the maintenance personnel to perform the scheduled maintenance during the maintenance time period consistent with the first database 26, the second database 28, the resident locations, the available time periods of at least one maintenance worker, and a prospective location of the equipment. For example, the data processing system 44 may specify one or more personnel identifiers. The prospective location of the equipment generally coincides with the resident location or another authorized work location of the corresponding maintenance worker. If the equipment is mobile, the data processing system may segregate and track the prospective location of the equipment in an additional database associated with the data processing system.

Figure 5:
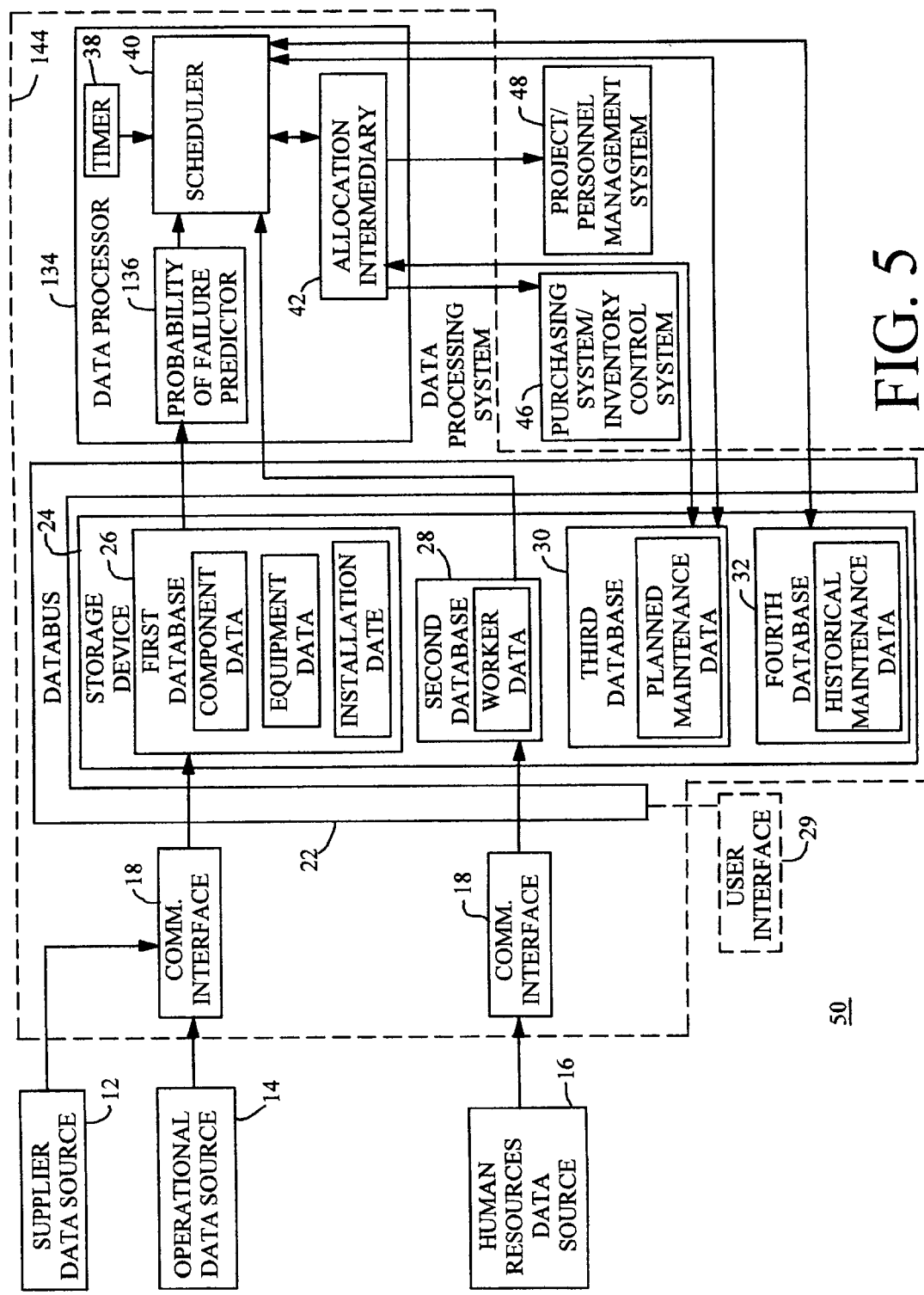
FIG. 5 is a block diagram of another system for performing predictive maintenance on equipment in accordance with the invention.

FIG. 5 is similar to FIG. 1 except FIG. 5 has a probability of failure predictor 136 and associated modifications, instead of a longevity estimator 36 of FIG. 1. A data processor 134 and a data processing system 144 of FIG. 5 are substantially similar to the data processor 34 and the data processing system 44 of FIG. 1 with the exception of any modifications necessary or appropriate for the support of the probability of failure detector 136, as opposed to the longevity estimator 36. Like reference numbers indicate like elements in FIG. 1 and FIG. 5.

The probability of failure predictor 136 estimates the probability of failure of a component to stop performing reliably within a certain time span with respect to the installation date or first date of usage of the equipment. Alternatively, the probability of failure predictor 136 estimates the probability of failure of a component based on the monitoring of system performance or component performance during use consistent with a predetermined performance profile for the component or the system. Further, the probability of failure predictor 136 may facilitate the identification of a performance deficiency or anomaly that influences the determination or revision of the estimated probability of failure or the required predictive maintenance.

In one example, if the equipment is new equipment, the new equipment may be first used as of a first date of usage, although an installation date of the component and the manufacturing date of the equipment, precedes the date of first usage. The probability of failure predictor 136 may use input data from one or more of the following: supplier data source 12, operational data source 14, and fourth database 32 (e.g., for historical maintenance data). The historical maintenance data may be gathered and tracked for various pieces of equipment.

The scheduler 40 may determine a probability of failure for a component, an assembly of components, or equipment based on the input of usage data on the equipment, usage of the system, or usage of the component and based on the historical longevity, mean-time-between-failure (MTBF), historical failure rate, or other performance data on a component, assembly, or equipment. In one example, the predictor 136 may determine reliability data or failure data for a second component in the same equipment or in different equipment than a first component if the second component is substantially similar to the first component and if the second component is present in an analogous technical environment to the first component.

The scheduler 40 may determine a probability of failure for each component or assembly of a configuration. The scheduler 40 may schedule predictive maintenance based on one or more of the following items:

1) if the configuration is out-of-date due to the recent detection of a defect or a discrepancy which would likely cause the equipment to be unavailable or nonfunctional;
2) if an estimated probability of failure for a component meets or exceeds a threshold probability of failure for the component;
3) if an estimated probability of failure for an assembly meets or exceeds a threshold probability of failure for the assembly of components; and
4) if an estimated probability of failure for the equipment meets or exceeds a threshold probability of failure overall for the equipment.

Once the threshold probability of failure is satisfied consistent with one or more of the above conditions, that data processing system 144 assigns a maintenance activity and planned maintenance time period to the component for storage in a planned maintenance database. In general, the scheduler 40 may assign a higher or lower priority to the scheduling of maintenance for components of the same equipment based on one or more of the following factors: the relative cost of the components, relative labor costs for installation of the components, relative availability of the components, relative probabilities of failures of the components, and the relative impacts on performance and safety of the equipment associated with the components. For example, the scheduler 40 may assign a higher priority to the scheduling of maintenance for a component with a higher probability of failure than other components of the equipment. Alternatively, the scheduler 40 may assign a higher priority to the condition or maintenance work where there is a high cost (e.g., economic or otherwise) of failure, even if the probability of failure is lower.

Figure 6:
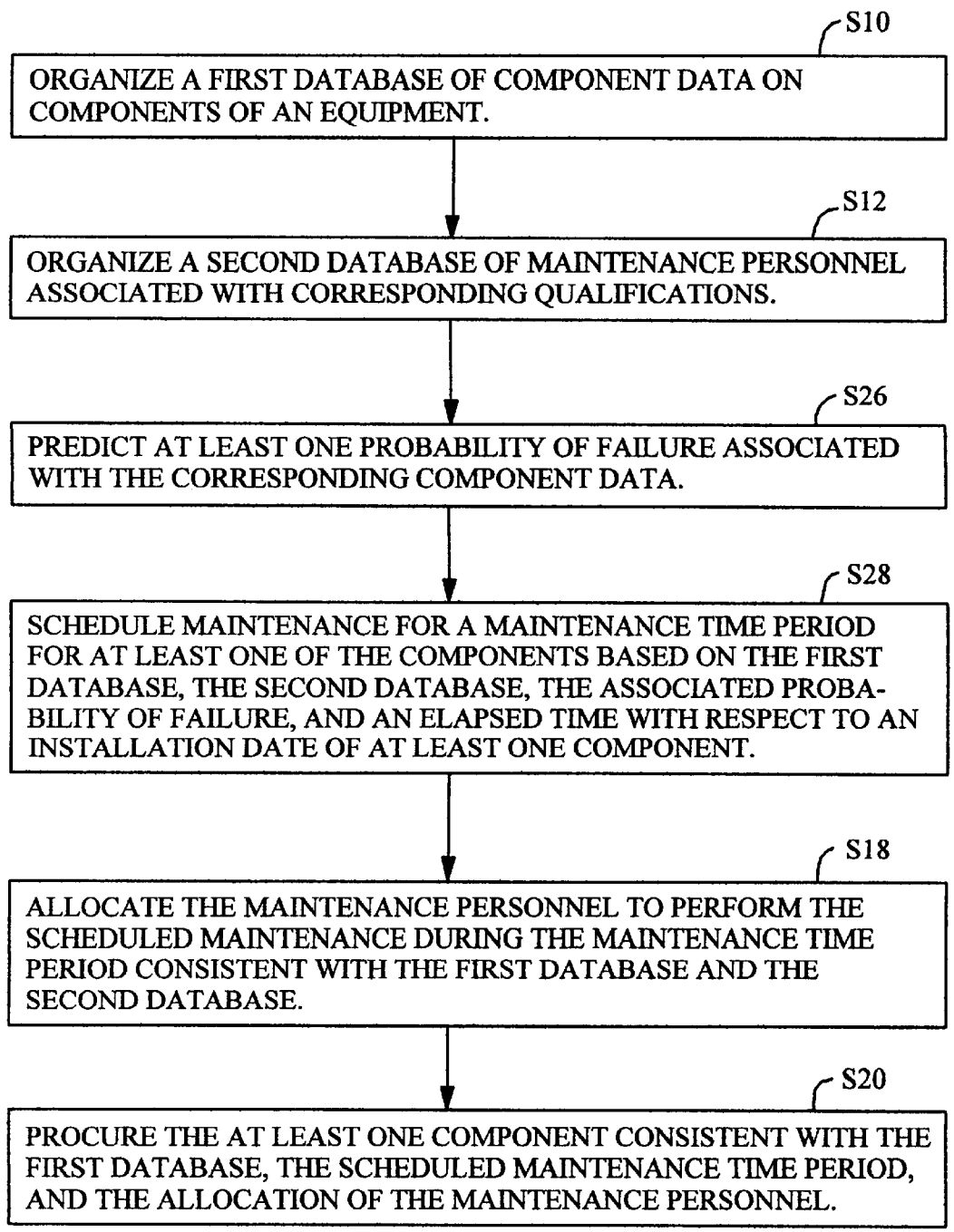
FIG. 6 is a flow chart of another embodiment of a method for performing predictive maintenance in accordance with the invention.

The method of FIG. 6 is similar to the method of FIG. 3 except step S26 of FIG. 6 replaces step S14 of FIG. 3 and step S28 of FIG. 6 replaces step S16. As shown in FIG. 6, step S26 is executed following step S12.

In step S26, the data processing system 44 or the predictor 136 predicts at least one probability of failure associated with the corresponding component data. The probability of failure may be associated with a corresponding component, a corresponding assembly of components, or all of the components of the equipment on an aggregate basis. For example, each component within a configuration of the equipment may have a corresponding probability of failure, which the predictor 136 may estimate based on an evaluation of historical data in the fourth database 32.

In step S28, the data processing system 144 schedules maintenance for a maintenance time period for at least one of the components based on the first database 26, the second database 28, the associated probability of failure, and an elapsed time with respect to an installation date of at least one component.

Figure 7:
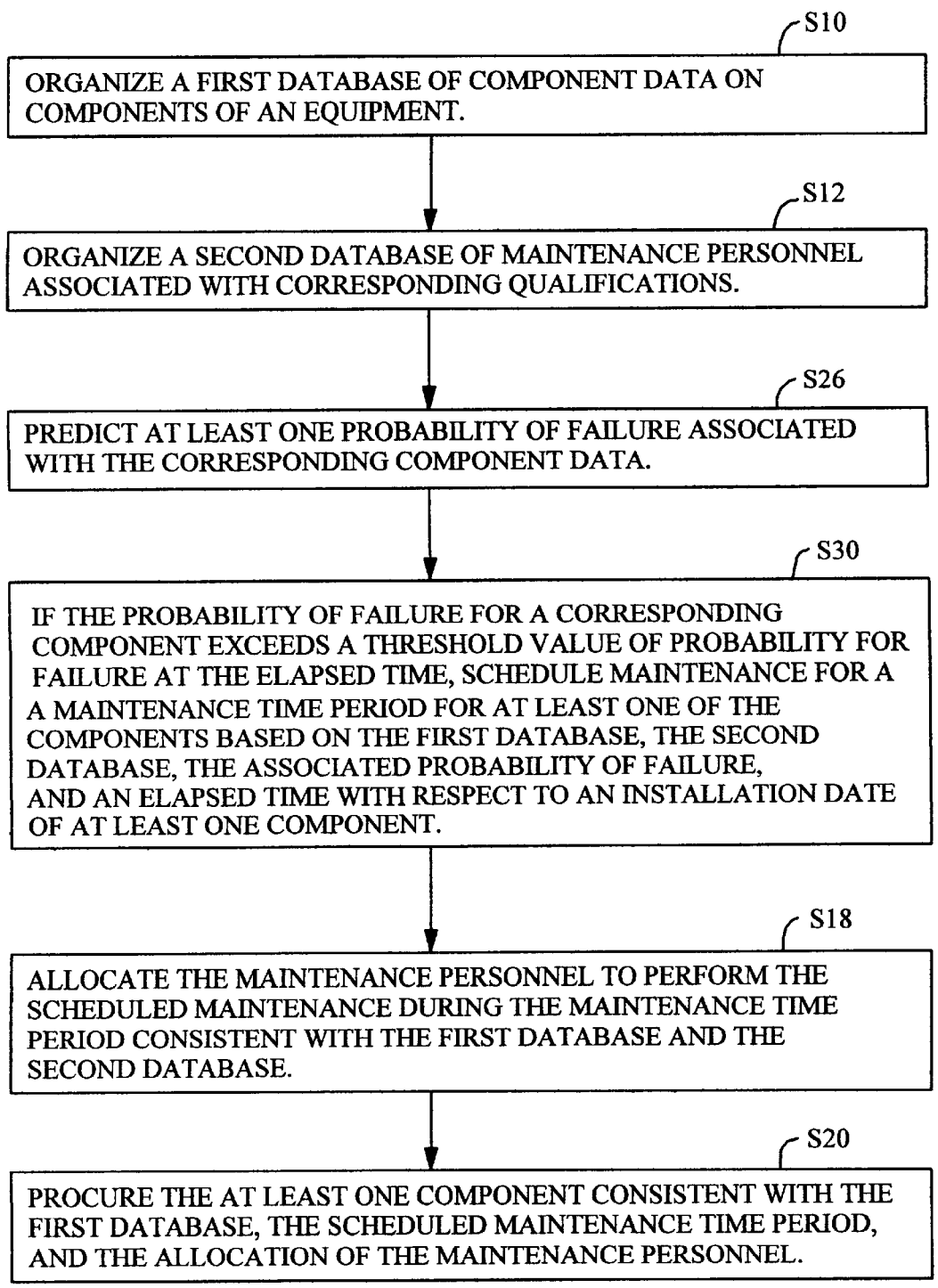
FIG. 7 is a flow chart of yet another embodiment of a method for performing predictive maintenance in accordance with the invention.

The method of FIG. 7 is similar to the method of FIG. 6 except the method of FIG. 7 replaces step S28 of FIG. 6 with step S30. Like reference numbers indicate like steps in FIG. 6 and FIG. 7. As shown in FIG. 6, step S30 follows step S26. In step S30, if the probability of failure for a corresponding component exceeds a threshold value of probability for failure at the elapsed time, the scheduler 40 schedules maintenance for at least one of the components based on the first database 26, the second database 28, the associated probability of failure, and an elapsed time with respect to an installation date of the at least one component. The elapsed time may coincide with the present time.

In an alternate embodiment, step S30 may consider the probability for an assembly of components, a system of components of the equipment, or the entire equipment, rather than a single component. That is, the probability of failure is associated with a component, a group of components, or the equipment as a whole.

Figure 8:
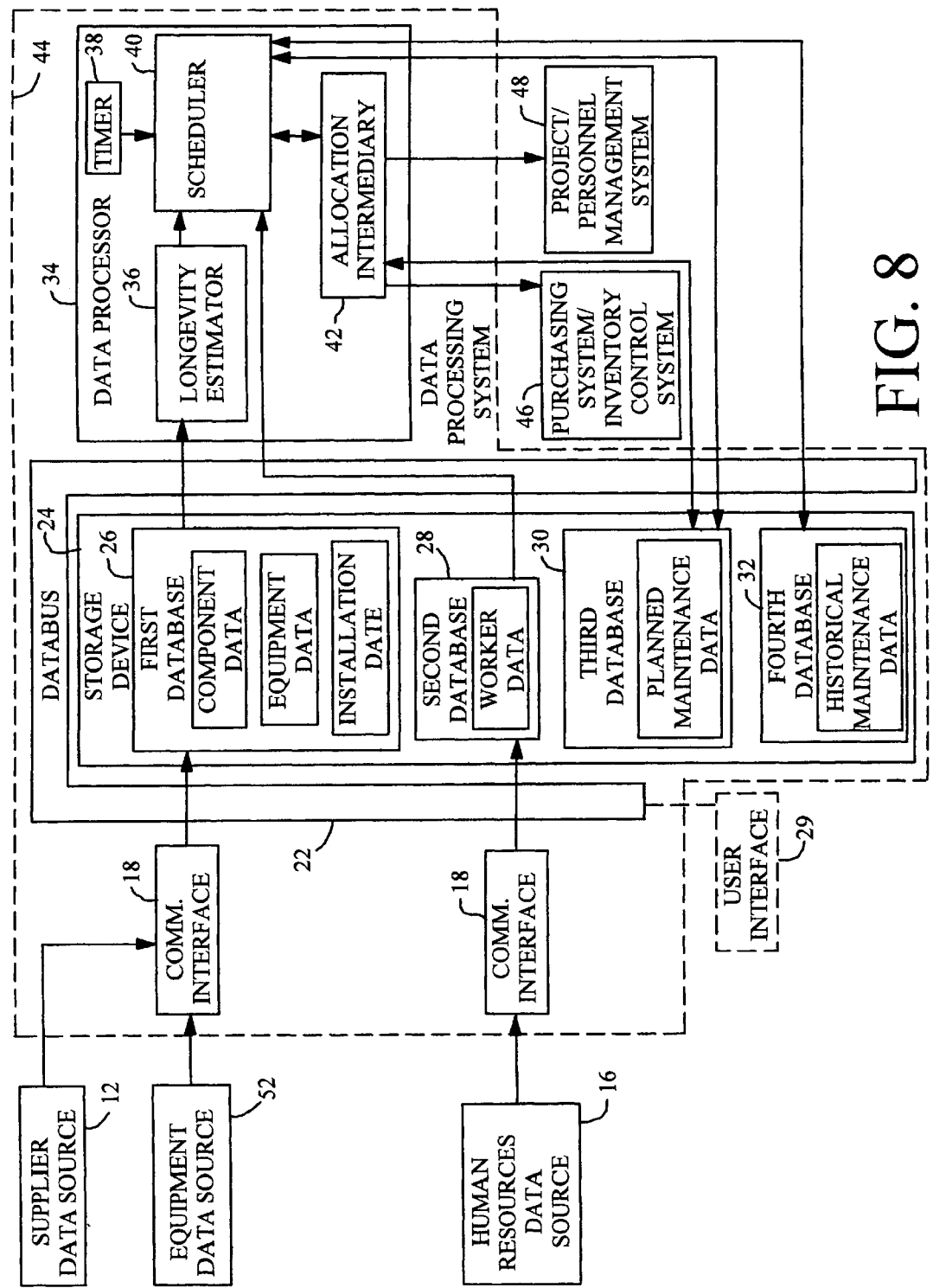
FIG. 8 is a block diagram of yet another system for performing predictive maintenance in accordance with the invention.

The predictive maintenance system of FIG. 8 represents a variation of the predictive maintenance system of FIG. 1. Like reference numbers in FIG. 1 and FIG. 8 indicate like elements. The predominant difference between the system of FIG. 1 and FIG. 8 is the replacement of the operational data source 14 and the equipment of FIG. 1 with the equipment data source 52.

The equipment data source 52 may represent a sensor 51 affiliated with the equipment, a monitoring or data collection system on the equipment, or another information source. The communication between the equipment data source 52 and the communications interface may be conducted over any type of communications link, including a wireless communications link.

Figure 9:
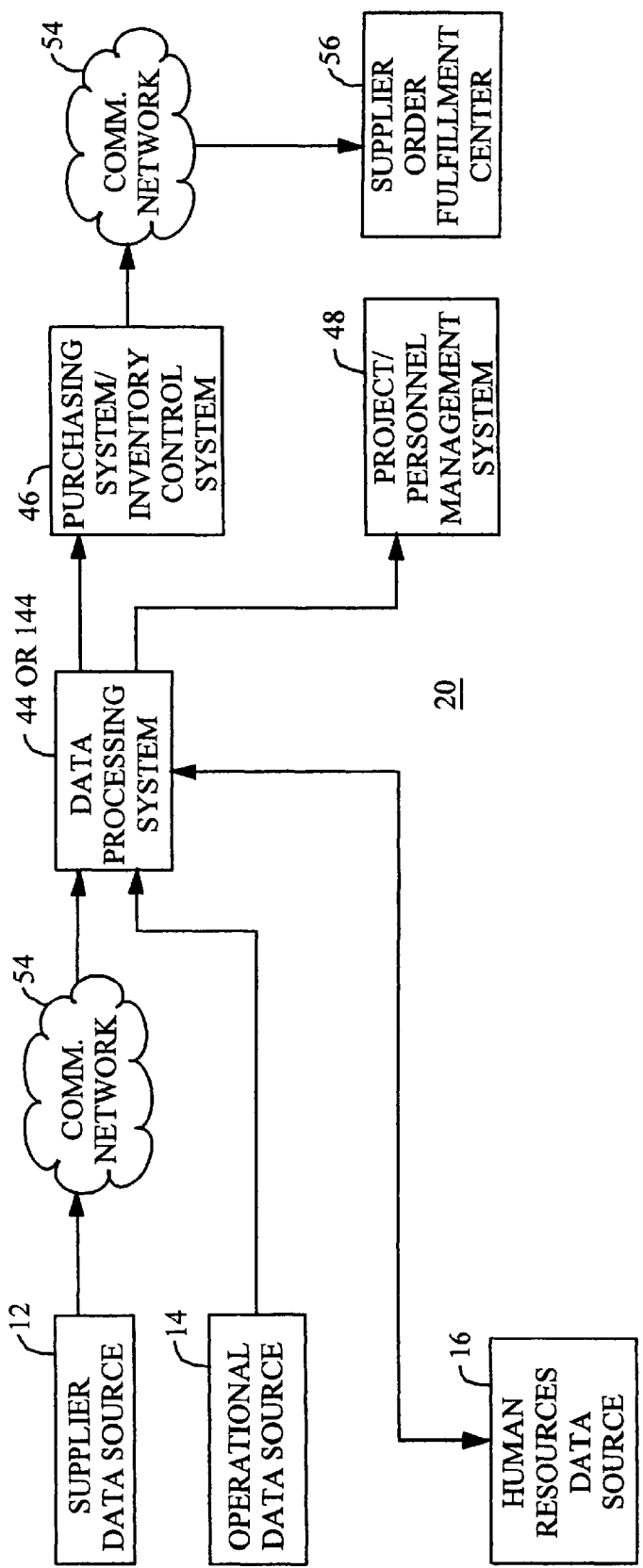
FIG. 9 is a block diagram of a communications system including the data processing system consistent with the invention.
Figure 10:
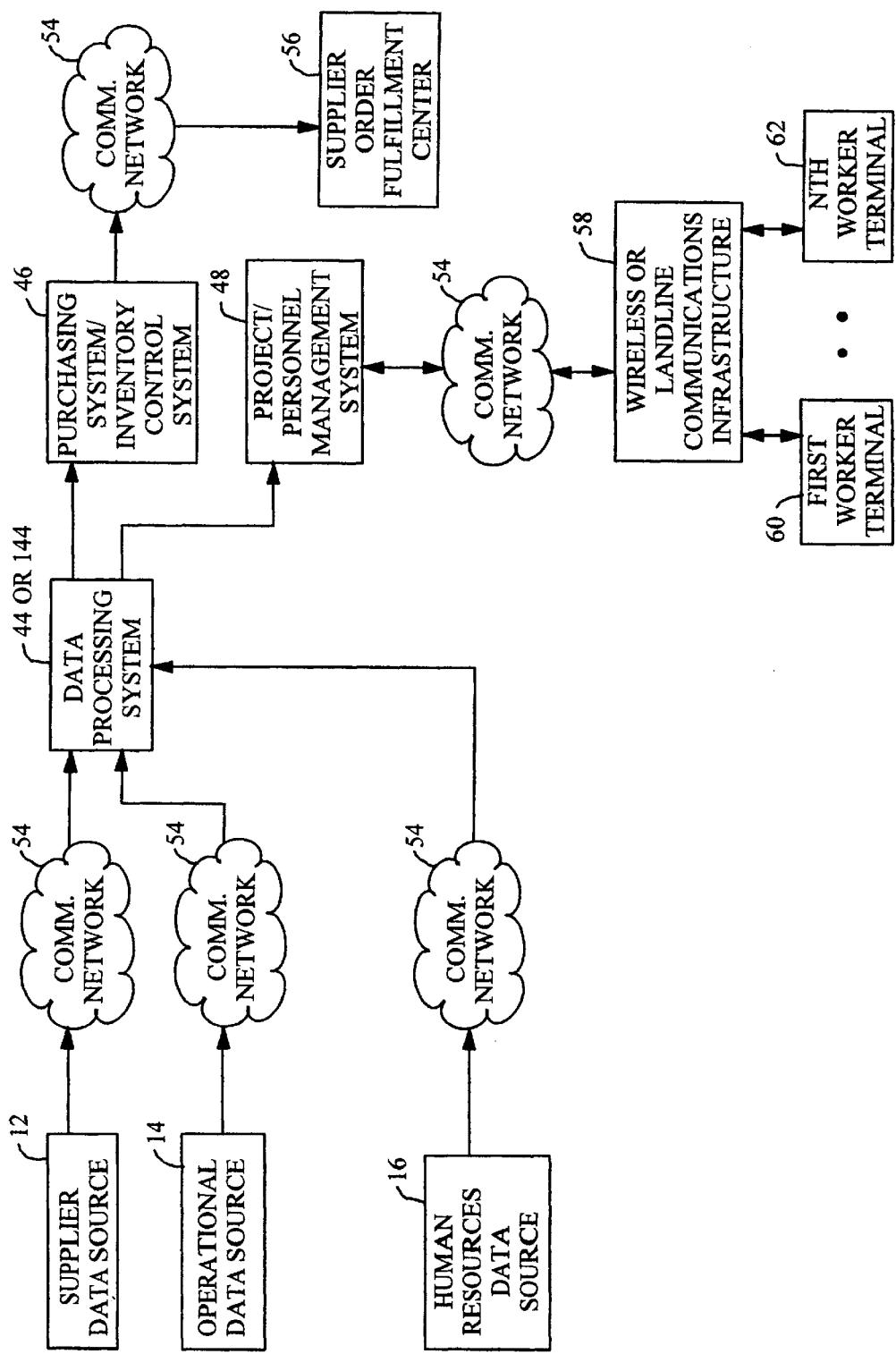
FIG. 10 is a block diagram of a communications system that supports the distribution of maintenance workers and equipment throughout different geographic locations, consistent with the invention.

FIG. 9 and FIG. 10 show illustrative examples of how a data processing system may be used in conjunction with a communications network 54 to automate various aspects of predictive maintenance in accordance with the invention.

In FIG. 9, a data processing system (44 or 144), the operational data source 14, the human resources data source 16, the purchasing system 46, and the personnel management system 48 may be co-located at a common site or in close proximity to one another. In contrast, the supplier data source 12 may communicate with the data processing system (44 or 144) over a communications network 54. The supplier data source 12 may be located at a supplier site. A supplier site refers to any site that is owned or controlled by the supplier of components, assemblies, or systems for the equipment. Similarly, a supplier order fulfillment center 56 may be located at the supplier site. The purchasing system 46 communicates with the supplier order fulfillment center 56 over a communications network 54. The communications network 54 may comprise the Internet, an intranet, a communications system that supports a switched circuit connection, a communications system that supports a virtual circuit connection, a data packet network, or another suitable telecommunications interconnection.

The data processing system (44 or 144) supports electronic communications with the supplier data source 12. The electronic communications may facilitate reduced costs in maintaining the first database 26 and updating input data for the data processing system (44 or 144) than would otherwise be possible with clerical workers manually entering data into a database. For example, longevity data or manufacturing data may be readily available to the data processing system (44 or 144) to foster accurate logistics decisions involving predictive maintenance.

The purchasing system 46 supports communication with the supplier order fulfillment center 56. Communications between the purchasing system 46 and the suppler order fulfillment center 56 may be automated to facilitate the acquisition of components, assemblies of components, or systems of Components to meet planned maintenance activity or maintenance requirements on a forecasted basis or well in advance of when the maintenance will actually take place. Accordingly, the operator of the equipment or the responsible operations, maintenance, and repair center may maintain a lower inventory of components or parts for the equipment, while reducing the cycle time for maintenance activity that might otherwise occur for unavailable or backordered parts.

The communications network 54 of FIG. 10 supports a distributed entity that manages predictive maintenance of the equipment. The distributed entity has human resources (e.g., maintenance workers) and components of equipment that may be located at different geographic locations (e.g., different warehouses). Further, the equipment may be mobile or portable with geographic locations that change over time. The supplier data source 12, the operational data source 14 and the human resources data source 16 communicate with the data processing system over one or more communications networks 54. The data processing system (44 or 144), the purchasing system 46, and the personnel management system 48 may be co-located. The purchasing system 46 preferably communicates with the supplier's order fulfillment center 56 via a communications network 54.

The personnel management system 48 may communicate with a wireless or landline communications infrastructure 58 via a communications network 54. The wireless or landline communications infrastructure 58 is associated with a first worker terminal 60 through an nth worker terminal 62. The worker terminals (60, 62) are electronic terminals of workers who are responsible for maintaining the equipment. For example, each worker terminal may represent a mobile phone, a mobile terminal with a display, a pager, a personal digital assistant, or another communications device. In one embodiment with a two-way messaging wireless air interface, workers can interact with the personnel management system 48 to provide real-time availability information and to check on future assignments of planned maintenance.

In one embodiment, the maintenance data in a planned maintenance database (e.g., the third database 30) may be made accessible (e.g., conveyed as a password protected web-page or as a read-only bulletin board) to suppliers, maintenance workers, server workers, and other parties that participate or directly or indirectly support the maintenance of the equipment. In another embodiment, the planned maintenance database (e.g., the third database 30) is associated with a communications distribution system that may subdivide and distribute (e.g., electronically transmit) the maintenance to plan to applicable participants, such as suppliers, purchasing agents, planners, buyers, maintenance workers, or engineering staff members.

Once the predictive maintenance work is completed for a particular component or assembly, the maintenance worker updates a maintenance history database (e.g., the fourth database 32). The scheduler 40 may compare the planned maintenance database to the maintenance history database (e.g., the fourth database 32) to remove completed maintenance activities and planned maintenance activities from the planned maintenance database. In one embodiment, the update of the planned maintenance database occurs in real-time. In another embodiment, the update of the planned maintenance database occurs on a daily basis, a weekly basis, or upon the expiration of a desired interval.

Figure 11:
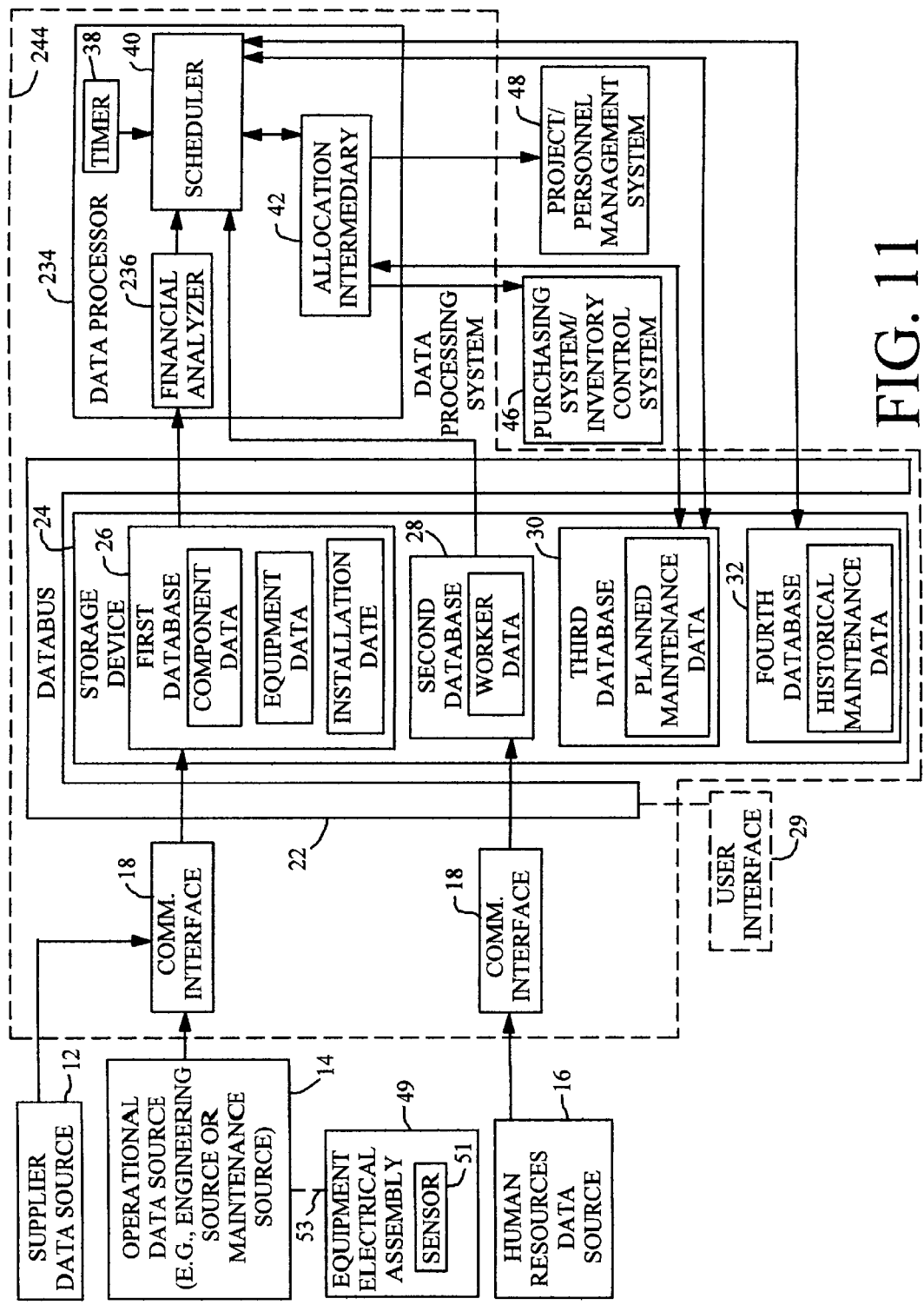
FIG. 11 is a block diagram of another embodiment of a system for performing predictive maintenance in accordance with the invention.

FIG. 11 is a block diagram of an alternate embodiment of a data processing system which includes a financial analyzer 236. FIG. 11 is similar to FIG. 1 except the financial analyzer 236 of FIG. 11 replaces the longevity estimator 36 of FIG. 1 and other accompanying modifications. Like reference numbers indicate like elements in FIG. 1 and FIG. 11. A data processor 234 and a data processing system 244 of FIG. 11 are substantially similar to the data processor 34 and the data processing system 44 of FIG. 1 with the exception of any modifications necessary to support the financial analyzer 236, as opposed to the longevity estimator 36.

The financial analyzer 236 accesses the third database 30 and may provide a cost estimate for a potential maintenance requirement based on one or more of the following: internal cost data on labor, consumable materials, components, assemblies, indirect costs and direct costs. Direct costs are costs or expenses that are directly associated with maintenance or repair, including parts and labor for a component. Indirect costs are costs or expenses that represent fixed capital costs, sunk capital costs, or other costs that are required to support the business entity performing the maintenance and repair. For example, indirect costs include costs for lease of a repair facility, purchasing of a repair facility, or capital improvement expenses for repair facilities. In an alternate embodiment, the a supplier of labor, a supplier of consumable material and a supplier of components may provide external cost data on the planned maintenance activity. Accordingly, the financial analyzer 236 may allow the owner or operator of the equipment to veto the planned maintenance activity that is too expensive to be practical given the internal cost data, the external cost data, or both.

The scheduler 40 may schedule predictive maintenance based on or more of the following items where the financial analyzer 236 is present in the data processing system:

1) if a financial analyzer 236 determines that a component can be replaced more economically at an earlier time than at a later time because of component availability, labor conditions, inflation of component costs, supplier activities, or other economic factors; and 2) if the financial analyzer 236 determines that an assembly can be replaced more economically at an earlier scheduled time than at a later time because of component availability, labor conditions, inflation of component costs, supplier activities, or other economic factors.

The financial analyzer 236 may provide a financial estimate of the expense of maintaining a component of the equipment. The expense of maintaining a component includes direct and indirect costs of performing a maintenance activity. The work execution system captures time and materials related to a maintenance action. The financial analyzer 236 may use information from the human resources system (salary and worker) and information related to the cost in time and materials for maintenance of the equipment.

The predictive maintenance procedure may support or cooperate with a configuration management procedure that allows the update of configurations of the equipment. The predictive maintenance procedure may support financial management so that equipment is maintained in an operative and reliable manner according to a maintenance schedule that minimizes maintenance costs, downtime, and unexpected failure. The predictive maintenance is well-suited for facilitating improved resource management. Resource management includes planning for material procurement and human resources allocation.

Figure 12:
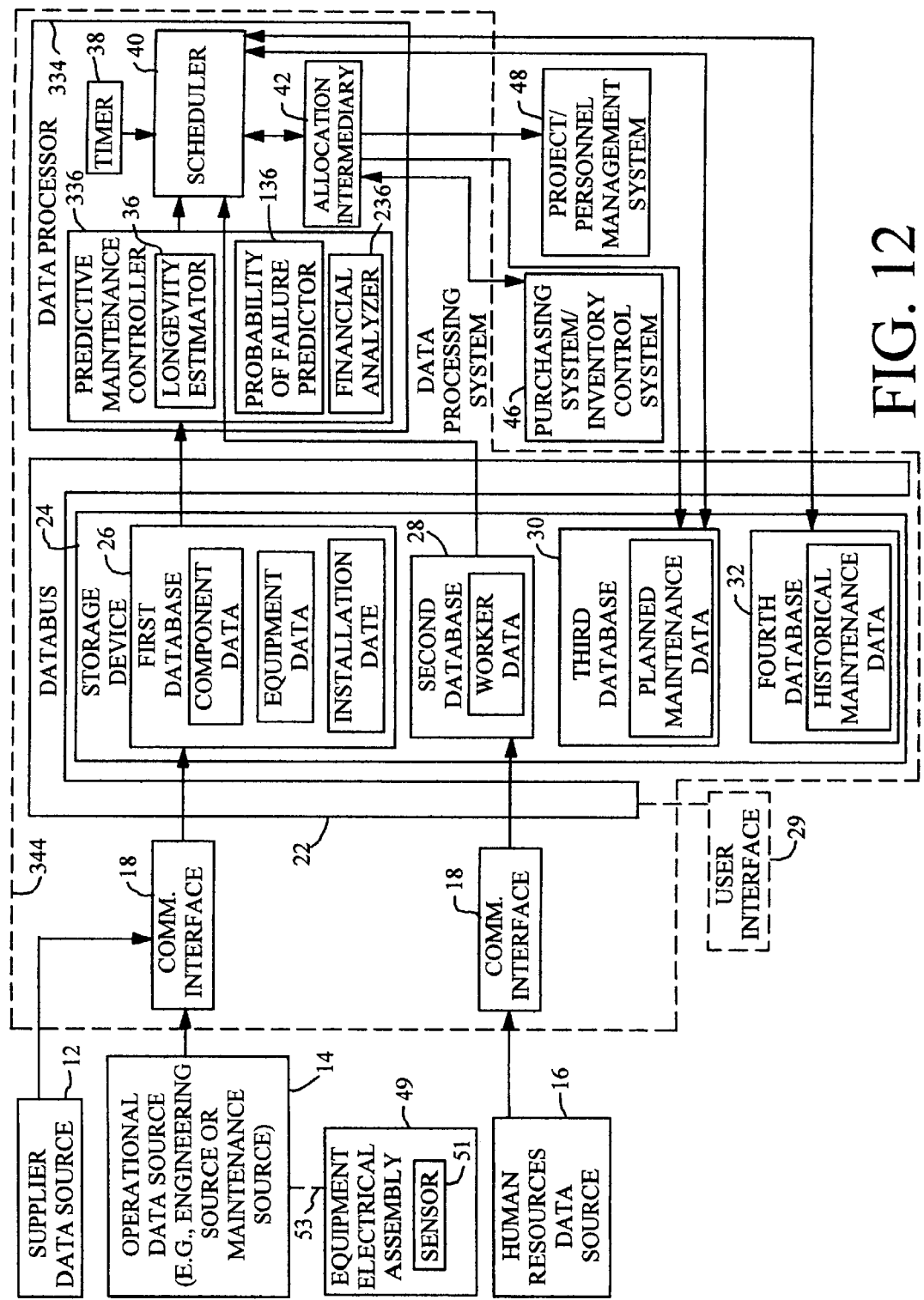
FIG. 12 is a block diagram of yet another embodiment of a system for performing predictive maintenance in accordance with the invention.

FIG. 12 is a block diagram of an alternate embodiment of a data processing system 334 which includes a predictive maintenance controller 336. FIG. 12 is similar to FIG. 1 except the predictive maintenance controller 336 of FIG. 12 replaces the longevity estimator 36 of FIG. 1 and any other accompanying modifications. Like reference numbers indicate like elements in FIGS. 1, 5, 8, 11 and 12. A data processor 336 and a data processing system 344 of FIG. 12 are substantially similar to the data processor 34 and the data processing system 44 of FIG. 1 with the exception of any modifications necessary to support the predictive maintenance controller 336, as opposed to the longevity estimator 36.

The predictive maintenance controller 336 includes one or more of the following: (1) the longevity estimator 36, (2) the probability of failure predictor 136, and (3) financial analyzer 236 to provide a comprehensive solution for managing predictive maintenance of equipment for one or more business entities. In one embodiment, the predictive maintenance controller 336 coordinates the operation of the longevity estimator 36, the probability of failure predictor 136, and the financial analyzer 236. The predictive maintenance controller 336 interprets a longevity estimate from the longevity estimator on a component as assembly or a system; a probability of failure estimate on a component, assembly or system; or the equipment from the probability of failure detector; and a financial analysis or financial data from the financial analyzer to make a conclusion on maintenance activity that balances financial goals, safety goals, reliability goals, and performance goals of the equipment. A user may enter preferences or set ranges of financial goals, safety goals, reliability goals, and performance goals of the equipment. Accordingly, the outputted conclusion on maintenance activity is geared toward meeting the preferences or set ranges of established financial goals, safety goals, reliability goals, and performance goals. In some cases, safety, and reliability goals will necessarily outweigh financial goals, as to comply with government regulations, laws, and avoid unnecessary risks to those who use the equipment.

In one embodiment, a predictive maintenance controller 336 uses at least one of the longevity estimate and the probability of failure to tentatively schedule a proposed activity or a proposed plan of predictive maintenance. The financial analyzer 236 analyzes the proposed plan under a cost-benefit analysis to determine whether it is economically sound or feasible to execute the plan. If the proposed activity or the proposed plan is required for safety or reliability, as overriding condition, the proposed plan becomes a final predictive maintenance plan, which may be brought into action, regardless of the determination of the financial analyzer under the cost benefit analysis. However, if the proposed activity or proposed maintenance plan, is not favorable in the cost benefit analysis, the proposed plan may be dropped or flagged for supervisory review to ensure no safety issues or legal compliance issues prevent dropping the proposed maintenance plan.

Figure 13:
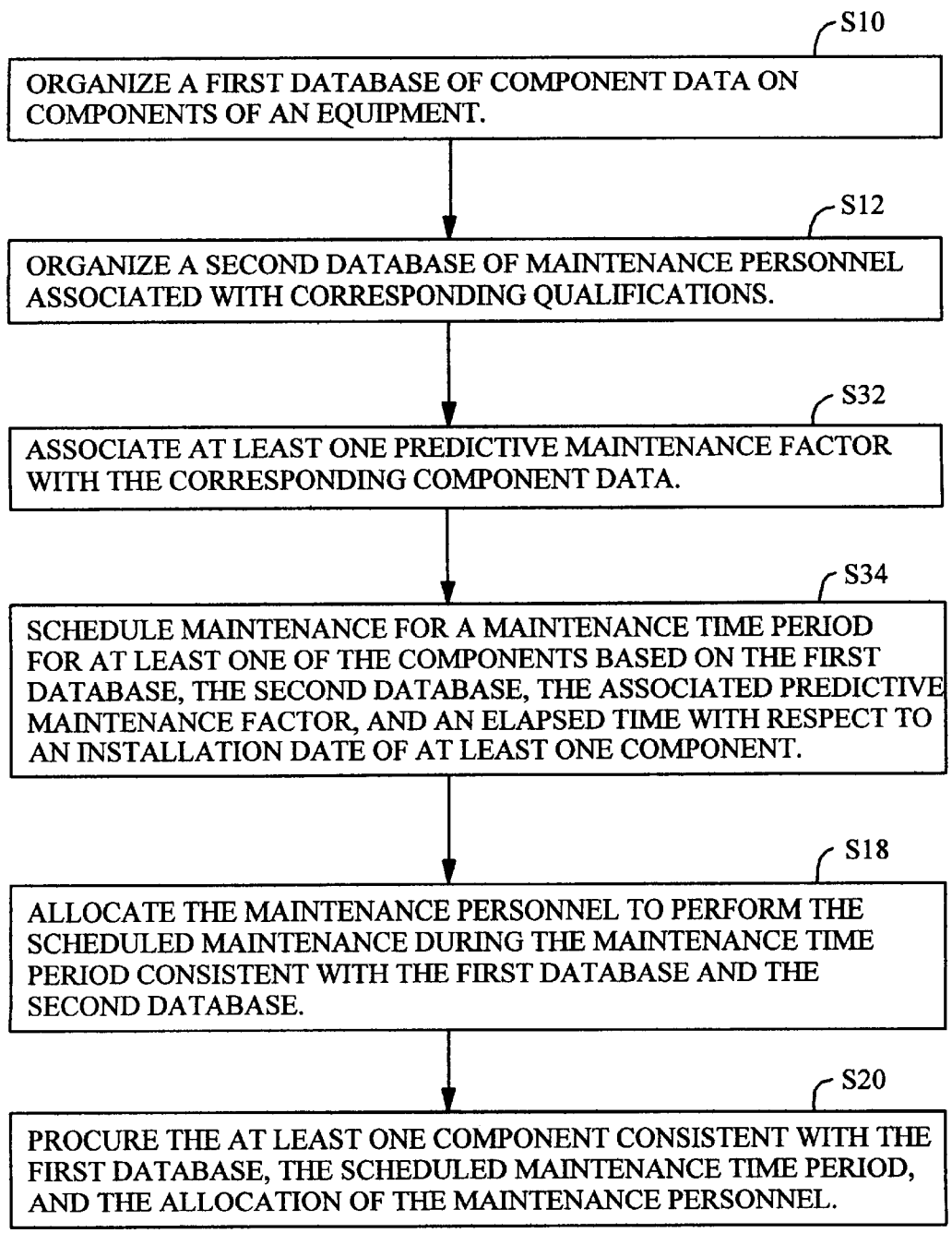
FIG. 13 is a flow chart of another embodiment of a method for performing predictive maintenance in accordance with the invention.

The method of FIG. 13 applies to the configuration of the system shown in FIG. 12. The method of FIG. 13 is similar to the method of FIG. 3, except the method of FIG. 13 replaces step S14 with step S32 and replaces step S16 with step S34. Like reference numbers indicate like elements in FIG. 3 and FIG. 13.

In step S32, at least one predictive maintenance factor is associated with the corresponding component data. The predictive maintenance factor refers to one or more of the following: a longevity estimate, a probability of failure, a financial estimate on maintenance of a component. In one embodiment, the predictive maintenance factor includes a longevity estimate for a component; a probability of failure for a component, an assembly of components, or a system of components; and a financial estimate on maintenance of a component, an assembly of components, or a system of components.

In step S34, the scheduler schedules maintenance for a maintenance time period for at least one of the components based on the first database, the second database, the associated predictive maintenance factor, and an elapsed time with respect to an installation date of the at least one component.

Notwithstanding the above operation of the scheduler 40, any of the embodiments of the data processing system (44, 144, 244, or 344) may include a user interface (e.g., a graphical user interface) to allow an operator to control and schedule the predictive maintenance procedure. For example, a user of the user interface may seize control of the scheduler 40 and schedule maintenance activity based on one or more of the following items:

1) if an authorized engineering or maintenance representative requests maintenance in advance of the failure of a component, an assembly, or the equipment to meet a desired availability of the equipment;

2) if the maintenance history indicates that a component was last replaced prior to a specific time period; and 3) if the manufacturer's service recommendations require certain maintenance activities to maintain warranty coverage or optimum performance of the equipment.

The foregoing description of the method and system describes several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

The following is claimed:

1. A method for managing maintenance of equipment, the method comprising:

storing component data on components of an equipment;

storing worker data on maintenance personnel associated with corresponding qualifications;

associating at least one predictive maintenance factor with the corresponding component data; and scheduling maintenance for a maintenance time period for at least one of the components based on the component data, the worker data, the associated predictive maintenance factor, and an elapsed time with respect to an installation date of at least one component.

2. The method according to claim 1 wherein the at least one predictive maintenance factor comprises a longevity estimate for at least one of a corresponding component, a corresponding assembly of the components, and the equipment.

3. The method according to claim 1 wherein the at least one predictive maintenance factor comprises a probability-of-failure estimate for at least one of a corresponding component, a corresponding assembly of the components, and the equipment.

4. The method according to claim 1 wherein the at least one predictive maintenance factor includes a financial estimate associated with the equipment.

5. The method according to claim 1 wherein the at least one predictive maintenance factor includes at least one of a longevity estimate, a probability-of-failure estimate, and a financial estimate.

6. The method according to claim 1 further comprising:

receiving the component data from a supplier data source via a communications network.

7. The method according to claim 1 further comprising:

receiving operational data on the equipment from an operational data source, the operational data including at least one of the component data, equipment data, and installation date of a component.

8. The method according to claim 1 further comprising:

receiving operational data from a sensor of the equipment; the operational data being stored in a database along with the component data.

9. The method according to claim 1 further comprising:

receiving the worker data from a human resources data source via a communications network.

10. A method for managing maintenance of equipment, the method comprising:

organizing a first database of equipment components and corresponding longevities associated with the equipment components;

organizing a second database of maintenance personnel associated with corresponding personnel locations and qualifications;

scheduling maintenance for the equipment component within a scheduled time period prior to expiration of its corresponding longevity; and allocating the maintenance personnel and procuring the equipment component, based on the first database and the second database, consistent with the scheduled time period and availability of the maintenance personnel at an equipment location of the equipment.

11. The method according to claim 10 wherein the equipment is mobile and wherein the allocating brings together the maintenance personnel, the equipment component, and the equipment at the location during the scheduled time period.

12. The method according to claim 10 further comprising tracking an installation date for a corresponding component of the equipment.

13. The method according to claim 12 further comprising the step of estimating a remaining life span by determining a usage time span between the installation date and the present date, and deducting the usage time span from the longevity for a corresponding component.

14. The method according to claim 13 wherein the usage time span represents a measure of an aggregate active duration of the component or the equipment.

15. The method according to claim 13 wherein the usage time span represents the passage of time, regardless of whether or not the equipment is active.

16. A system for managing maintenance of equipment, the system comprising:

a storage device for storing component data on components of an equipment; the storage device arranged to store worker data on maintenance personnel associated with corresponding qualifications;

a predictive maintenance controller for associating at least one predictive maintenance factor with the corresponding component data; and a scheduler for scheduling maintenance for a maintenance time period for at least one of the components based on the component data, the worker data, the associated predictive maintenance factor, and an elapsed time with respect to an installation date of at least one component.

17. The system according to claim 16 wherein the predictive maintenance controller comprises a longevity estimator for providing a longevity estimate for at least one of a corresponding component, a corresponding assembly of the components, and the equipment.

18. The system according to claim 16 wherein the predictive maintenance controller comprises a probability-of-failure estimator for estimating a probability of failure for at least one of a corresponding component, a corresponding assembly of the components, and the equipment.

19. The system according to claim 16 wherein the predictive maintenance controller comprises a financial analyzer for determining a financial estimate associated with respect to maintenance of the equipment.

20. The system according to claim 16 wherein the predictive maintenance controller comprises at least at least one of a longevity estimator, a probability-of-failure estimator, and a financial analyzer.

21. The system according to claim 16 further comprising:

a supplier data source;

a communications interface for receiving the component data from the supplier data source, the communications interface providing the component data to a first database of the storage device.

22. The system according to claim 16 further comprising:

a communications interface for receiving operational data on the equipment from an operational data source, the communications interface providing the operational data to the storage device.

23. The system according to claim 16 further comprising:

a communications interface associated with the storage device;

an operational data source in communication with a sensor affiliated with the equipment, the operational data source coupled to the communications interface.

24. The system according to claim 16 further comprising:

a communications interface associated with the storage device, the communications interface receiving human resources data from a human resources data source for storage in a second database of the storage device.

25. The system according to claim 16 further comprising an allocation intermediary coupled to the scheduler, the allocation intermediary arranged to coordinate the bringing together of required component data, worker data, tools, and instructions for planned maintenance at a common geographic location where the equipment is or will be situated.

26. The system according to claim 16 further comprising:

a purchasing system receiving information on the scheduled maintenance provided by the scheduler, the purchasing system executing purchasing of a required component for the equipment consistent with the scheduled maintenance.

27. The system according to claim 26 further comprising:

a supplier order fulfillment center coupled to the purchasing system via a communications network for exchanging transactional data with the supplier on at least one required component of the equipment, consistent with the scheduled maintenance.

28. The system according to claim 16 further comprising:

a personnel management system receiving information on the scheduled maintenance provided by the scheduler, the personnel management system executing purchasing of a required component for the equipment consistent with the personnel management.

29. The system according to claim 16 further comprising:

a supplier data source for providing data to a first database of the storage device via a communications network;

an operational data source for providing data to the first database via the communications network; and a human resources data source for providing data to a second database of the storage device via the communications network.

30. The system according to claim 16 further comprising:

a personnel management system receiving data from the scheduler;

communications infrastructure coupled to the personnel management system, the communications infrastructure including at least one worker terminal for presentation of a maintenance assignment to the worker consistent with the scheduled maintenance.

31. The system according to claim 30 wherein the infrastructure comprises a wireless system and the worker terminal comprises a wireless communications device.

* * * * *

UNITED STATES PATENT AND TRADEMARK OFFICE
CERTIFICATE OF CORRECTION

PATENT NO. : 6,738,748 B2
DATED : May 18, 2004
INVENTOR(S) : Michael Wetzer et al.

It is certified that error appears in the above-identified patent and that said Letters Patent is hereby corrected as shown below:

Column 1,
Line 21, before "equipement." delete "a" and substitute -- the -- in its place.

Column 3,
Line 24, after "multiple" delete "databases" and substitute -- databuses -- in its place.

Column 7,
Lines 58-59, delete "component by-component" and substitute -- component-by-component -- in its place.

Column 12,
Line 31, delete "Components" and substitute -- components -- in its place.
Line 60, after "through an" delete "nth" and substitute -- $n^{th}$ -- in its place.

Column 13,
Line 51, before "a supplier" delete "the".

Column 17,
Line 38, delete "at least" (second occurrence).

Signed and Sealed this

Seventh Day of June, 2005

JON W. DUDAS
*Director of the United States Patent and Trademark Office*